(12) United States Patent
Kojima

(10) Patent No.: US 8,791,197 B2
(45) Date of Patent: Jul. 29, 2014

(54) RUBBER COMPOSITION FOR WINTER TIRE, AND WINTER TIRE

(75) Inventor: Ryoji Kojima, Kobe (JP)

(73) Assignee: Sumitomo Rubber Industries, Ltd., Kobe-shi (JP)

( * ) Notice: Subject to any disclaimer, the term of this patent is extended or adjusted under 35 U.S.C. 154(b) by 0 days.

(21) Appl. No.: 13/558,693

(22) Filed: Jul. 26, 2012

(65) Prior Publication Data

US 2013/0030111 A1 Jan. 31, 2013

(30) Foreign Application Priority Data

Jul. 27, 2011 (JP) ................. 2011-164616

(51) Int. Cl.
 *B60C 1/00* (2006.01)
(52) U.S. Cl.
 USPC .............................. 524/506; 524/526; 528/30
(58) Field of Classification Search
 USPC .......................................... 524/506; 528/30
 See application file for complete search history.

(56) References Cited

U.S. PATENT DOCUMENTS

| | | | |
|---|---|---|---|
| 2006/0116465 A1 | 6/2006 | Hiza et al. | |
| 2010/0288406 A1 | 11/2010 | Kitamura et al. | |
| 2011/0046291 A1 | 2/2011 | Kojima | |

FOREIGN PATENT DOCUMENTS

| | | |
|---|---|---|
| JP | 6-240052 A | 8/1994 |
| JP | 9-255813 A | 9/1997 |
| JP | 2004-196944 A | 7/2004 |
| JP | 2004-277506 A | 10/2004 |
| JP | 2005-41924 A | 2/2005 |
| JP | 2006-56967 A | 3/2006 |
| JP | 2006-131714 A | 5/2006 |
| JP | 2006-274051 A | 10/2006 |
| JP | 2007-277437 A | 10/2007 |
| JP | 2008-106113 A | 5/2008 |
| JP | 2008-120937 A | 5/2008 |
| JP | 2008-127453 A | 6/2008 |
| JP | 2008-150426 A | 7/2008 |
| JP | 2008-266498 A | 11/2008 |
| JP | 2009-120819 A | 6/2009 |
| JP | 4289508 B1 | 7/2009 |
| JP | 2011-38057 A | 2/2011 |
| JP | 2011-132412 A | 7/2011 |
| JP | 2011-140547 A | 7/2011 |
| JP | 2011-140613 A | 7/2011 |

OTHER PUBLICATIONS

Machine translation of JP 2011-038057 A, Feb. 24, 2011.*

* cited by examiner

*Primary Examiner* — Vickey Nerangis
(74) *Attorney, Agent, or Firm* — Birch, Stewart, Kolasch & Birch, LLP

(57) ABSTRACT

The present invention provides a rubber composition for a winter tire which improves in performance on ice and snow, wet grip performance, and abrasion resistance in a balanced manner, and also has favorable proccessability; and a winter tire including a tread produced using the rubber composition. The present invention relates to a rubber composition for a winter tire which contains predetermined amounts of natural rubber, butadiene rubber, aromatic oil, silica, and carbon black, and also contains a specific silane coupling agent that includes a linking unit A represented by the following formula (1) and a linking unit B represented by the following formula (2) and has a predetermined content of the linking unit B.

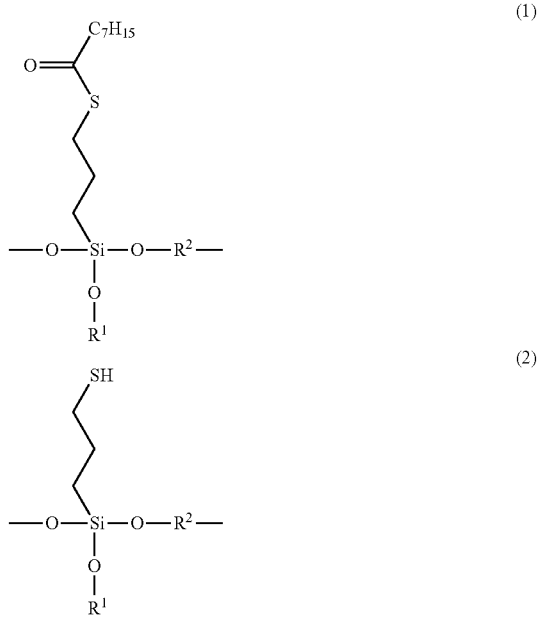

1 Claim, No Drawings

RUBBER COMPOSITION FOR WINTER TIRE, AND WINTER TIRE

TECHNICAL FIELD

The present invention relates to a rubber composition for a winter tire (studless tire), and a winter tire.

BACKGROUND ART

Use of spike tires has been banned by law in Japan for prevention of powder dust pollution resulting from the use of spike tires, and thus winter tires (studless tires) are now used instead of the spike tires in cold regions. Winter tires have been improved in their materials and designs for driving on icy or snowy roads having a rougher surface than that of usual roads. For example, a rubber composition has been proposed in which a diene rubber having excellent low-temperature properties (performance on ice and snow) is added and the amount of a softener is increased for a better softening effect. Here, as the softener, mineral oil is usually used to increase the low-temperature properties.

However, increasing the amount of mineral oil for an increase in low-temperature properties usually leads to a decrease in abrasion resistance. One possible method for solving such a problem is to use aromatic oil instead of mineral oil. In this case, however, the low-temperature properties decrease, thereby making it difficult to achieve sufficient performance on ice and snow. To address this, aromatic oil and silica are used in combination to increase the low-temperature properties without decreasing the abrasion resistance. However, the resulting performance properties remain insufficient. Meanwhile, in addition to the low-temperature properties and abrasion resistance, improved wet grip performance is also desired.

Patent Document 1, for example, discloses a rubber composition for a winter tire which contains large amounts of aromatic oil and silica and is enabled to improve the abrasion resistance, performance on ice and snow, and wet grip performance in a balanced manner. Nevertheless, in recent years, these performance properties have been desired to be further improved.

Patent Document 1: JP 2011-38057 A

SUMMARY OF THE INVENTION

The present invention aims to provide a rubber composition for a winter tire which solves the above problems, enables balanced improvement of the performance on ice and snow, wet grip performance, and abrasion resistance, and also has favorable proccessability; and a winter tire including a tread produced from the rubber composition.

The present invention relates to a rubber composition for a winter tire, including: a rubber component including natural rubber and butadiene rubber; aromatic oil; silica; carbon black; and a silane coupling agent, wherein a total content of the natural rubber and the butadiene rubber is 30% by mass or more based on 100% by mass of the rubber component; a content of the aromatic oil is 12 to 85 parts by mass and a content of the silica is 12 to 85 parts by mass, each per 100 parts by mass of the rubber component; a proportion of the silica to 100% by mass of a total of the silica and the carbon black is 45% by mass or more; and the silane coupling agent includes a linking unit A represented by the following formula (1) and a linking unit B represented by the following formula (2) and has a content of the linking unit B of 1 to 70 mol %:

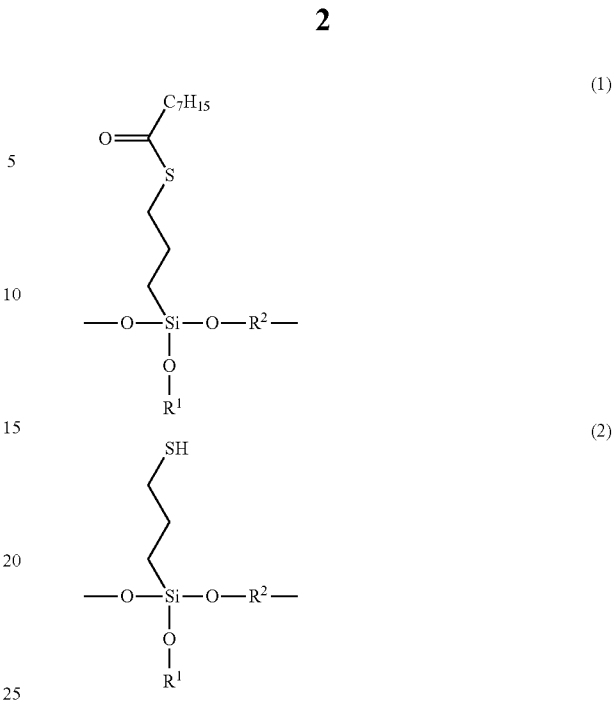

wherein $R^1$ represents hydrogen, halogen, a branched or unbranched C1 to C30 alkyl group, a branched or unbranched C2 to C30 alkenyl group, a branched or unbranched C2 to C30 alkynyl group, or a group in which a terminal hydrogen of the alkyl group is replaced by a hydroxyl group or a carboxyl group; $R^2$ represents a branched or unbranched C1 to C30 alkylene group, a branched or unbranched C2 to C30 alkenylene group, or a branched or unbranched C2 to C30 alkynylene group; and $R^1$ and $R^2$ together may form a ring structure.

A content of the silane coupling agent is preferably 1 to 20 parts by mass per 100 parts by mass of the silica.

The present invention also relates to a winter tire produced using the above rubber composition for a tread.

The present invention provides a rubber composition for a winter tire which contains predetermined amounts of natural rubber, butadiene rubber, aromatic oil, silica, and carbon black, and also contains a specific silane coupling agent. Use of this rubber composition for a tread enables to provide a winter tire of which the abrasion resistance, performance on ice and snow, and wet grip performance are improved in a balanced manner, at favorable productivity.

MODES FOR CARRYING OUT THE INVENTION

The rubber composition of the present invention contains predetermined amounts of natural rubber, butadiene rubber, aromatic oil, silica, and carbon black, and also contains a specific silane coupling agent. The addition of a specific silane coupling agent to a rubber composition containing predetermined amounts of components such as aromatic oil and silica improves the abrasion resistance, performance on ice and snow, and wet grip performance at high levels in a balanced manner, and also achieves favorable proccessability. Further, the respective properties can be greatly improved compared to the case of adding the silane coupling agent to a rubber composition that does not contain the predetermined amounts of components such as aromatic oil and silica.

(Rubber Component)

The present invention employs natural rubber and butadiene rubber in combination for the rubber component. The combination use enables to improve the low-temperature properties and the performance on ice and snow. Particularly, butadiene rubber is an important component for securing the performance on ice and snow.

Examples of the natural rubber (NR) include rubbers generally used in the tire industry, such as SIR20, RSS #3, and TSR20. The natural rubbers (NR) also include modified natural rubbers such as deproteinized natural rubber (DPNR), highly purified natural rubber (HPNR), epoxidized natural rubber (ENR), hydrogenated natural rubber (HNR), and grafted natural rubber. Each of these may be used alone, or two or more of these may be used in combination.

The butadiene rubber (BR) preferably has a cis content of 80% by mass or higher. Such BR enables to increase the abrasion resistance. The cis content is more preferably 85% by mass or higher, still more preferably 90% by mass or higher, and most preferably 95% by mass or higher.

Further, the BR preferably has a viscosity of 30 cps or higher in the form of a 5% by mass solution in toluene at 25° C. The viscosity lower than 30 cps may result in greatly lowered proccessability and also in poor abrasion resistance. The viscosity of the BR solution in toluene is preferably 100 cps or lower, and more preferably 70 cps or lower. The viscosity higher than 100 cps may deteriorate rather than improve the proccessability.

Additionally, in consideration of improvement in both proccessability and abrasion resistance, BR having an Mw/Mn ratio of 3.0 to 3.4 is preferred. The weight average molecular weight Mw and the number average molecular weight Mn used herein are measured with a gel permeation chromatograph (GPC) (GPC-8000 series produced by Tosoh Corporation, detector: differential refractometer, column: TSKGEL SUPERMULTIPORE HZ-M produced by Tosoh Corporation) and calibrated with polystyrene standards.

Examples of the BR include, but are not particularly limited to, BR with high cis content, such as BR1220 produced by Zeon Corporation, and BR130B and BR150B produced by Ube Industries, Ltd.; and BR containing a syndiotactic polybutadiene crystal, such as VCR412 and VCR617 produced by Ube Industries, Ltd.

The content of NR, based on 100% by mass of the rubber component, is preferably 30% by mass or more, more preferably 40% by mass or more, still more preferably 50% by mass or more, and particularly preferably 55% by mass or more. The content less than 30% by mass may result in a great decrease in tensile strength, and make it difficult to secure the abrasion resistance. The content of NR is preferably 80% by mass or less, more preferably 70% by mass or less, and still more preferably 65% by mass or less. The content more than 80% by mass may decrease the low-temperature properties, so that the levels of performance on ice and snow that are required for winter tires may not be secured.

The content of BR, based on 100% by mass of the rubber component, is preferably 10% by mass or more, more preferably 20% by mass or more, still more preferably 30% by mass or more, and particularly preferably 35% by mass or more. The content of 10% by mass or more can more successfully achieve the performance on ice and snow required for winter tires. The content of BR is preferably 80% by mass or less, more preferably 70% by mass or less, and still more preferably 60% by mass or less. The content more than 80% by mass may greatly deteriorate the proccessability and lead to occurrence of whitening due to bleeding of chemical agents.

The total content of NR and BR, based on 100% by mass of the rubber component, is 30% by mass or more, preferably 60% by mass or more, more preferably 80% by mass or more, and most preferably 100% by mass. A higher total content of NR and BR indicates better low-temperature properties, and can more successfully achieve the required performance on ice and snow.

The rubber component may include other rubbers as long as they do not inhibit the effects of the present invention. Examples of the other rubbers include styrene-butadiene rubber (SBR), isoprene rubber (IR), ethylene-propylene-diene rubber (EPDM), chloroprene rubber (CR), acrylonitrile-butadiene rubber (NBR), butyl rubber (IIR), and hologenated butyl rubber (X-IIR).

(Oil)

The rubber composition of the present invention contains a comparatively large amount of aromatic oil. In the case of using mineral oil which provides excellent low-temperature properties, the mineral oil secures sufficient performance on ice and snow but deteriorates the abrasion resistance. Decreasing the amount of mineral oil allows securement of abrasion resistance but results in a decrease in low-temperature properties and therefore a decrease in performance on ice and snow. Accordingly, the conflicting properties of high performance on ice and snow and high abrasion resistance cannot be achieved at the same time. In contrast, aromatic oil does not greatly decrease the abrasion resistance even when the blended amount thereof is large, which can lead to improvement of both the performance on ice and snow and the abrasion resistance. Using aromatic oil together with large amounts of silica and carbon black enables to achieve both the performance on ice and snow and the abrasion resistance at higher levels, and also achieve favorable wet grip performance.

As the aromatic oil suitably used in the present invention, mention may be made of, for example, those which have an aromatic hydrocarbon content in mass percentage of 15% by mass or more as determined in accordance with ASTM D2140. More specifically, process oil contains aromatic hydrocarbons ($C_A$), paraffinic hydrocarbons ($C_P$), and naphthenic hydrocarbons ($C_N$) in terms of its molecular structure. Process oil is roughly classified as aromatic oil, paraffinic oil, or naphthenic oil, based on the contents of $C_A$ (% by mass), $C_P$ (% by mass), and $C_N$ (% by mass). In view of this, the aromatic oil in the present invention preferably has a $C_A$ content of 15% by mass or more, and more preferably of 17% by mass or more. Also, the aromatic oil in the present invention preferably has a $C_A$ content of 70% by mass or less, and more preferably of 65% by mass or less.

Examples of commercially available aromatic oil products include AC-12, AC-460, AH-16, AH-24, and AH-58 produced by Idemitsu Kosan Co., Ltd., and Process NC300S produced by Japan Energy Corporation.

The content of aromatic oil is 12 parts by mass or more, preferably 15 parts by mass or more, more preferably 30 parts by mass or more, still more preferably 45 parts by mass or more, and particularly preferably 60 parts by mass or more, per 100 parts by mass of the rubber component. A higher content of aromatic oil leads to a better softening effect and better low-temperature properties, which results in improvement in performance on ice and snow. The content of aromatic oil is 85 parts by mass or less, and preferably 80 parts by mass or less, per 100 parts by mass of the rubber component. The content more than 85 parts by mass may deteriorate the properties such as proccessability, abrasion resistance, and aging resistance.

(Silica)

The rubber composition of the present invention contains a comparatively large amount of silica. Using silica together with aromatic oil can improve both the abrasion resistance and the performance on ice and snow, and at the same time can enhance the wet grip performance which has been considered as a weakness of conventional winter tires. Examples of the silica include, but are not particularly limited to, silica produced by a wet process and silica produced by a dry process.

The nitrogen adsorption specific surface area ($N_2SA$) of silica is preferably 80 $m^2/g$ or larger, more preferably 120 $m^2/g$ or larger, and still more preferably 150 $m^2/g$ or larger. The $N_2SA$ smaller than 80 $m^2/g$ may greatly deteriorate the tensile strength and make it difficult to secure the abrasion resistance. Also, the $N_2SA$ of silica is preferably 250 $m^2/g$ or smaller, more preferably 220 $m^2/g$ or smaller, and still more preferably 180 $m^2/g$ or smaller. The $N_2SA$ larger than 250 $m^2/g$ may greatly increase the viscosity of a rubber composition containing such silica, resulting in deterioration of proccessability.

Here, the $N_2SA$ of silica is determined by the BET method in accordance with ASTM D3037-81.

The content of silica is 12 parts by mass or more, preferably 15 parts by mass or more, more preferably 30 parts by mass or more, and still more preferably 45 parts by mass or more, per 100 parts by mass of the rubber component. Blending silica in an amount of 12 parts by mass or more can more successfully achieve the performance on ice and snow required for winter tires. Also, the content of silica is 85 parts by mass or less, preferably 80 parts by mass or less, more preferably 70 parts by mass or less, and still more preferably 60 parts by mass or less, per 100 parts by mass of the rubber component. The content more than 85 parts by mass may deteriorate the proccessability and workability, and lead to poor low-temperature properties due to the increase in the filler content.

(Silane Coupling Agent)

The rubber composition of the present invention contains a silane coupling agent that includes a linking unit A represented by the following formula (1) and a linking unit B represented by the following formula (2) and has a content of the linking unit B of 1 to 70 mol %:

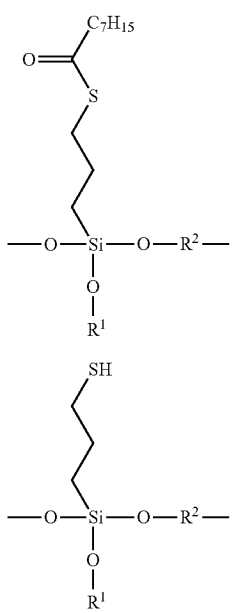

wherein $R^1$ represents hydrogen, halogen, a branched or unbranched C1 to C30 alkyl group, a branched or unbranched C2 to C30 alkenyl group, a branched or unbranched C2 to C30 alkynyl group, or a group in which a terminal hydrogen of the alkyl group is replaced by a hydroxyl group or a carboxyl group; $R^2$ represents a branched or unbranched C1 to C30 alkylene group, a branched or unbranched C2 to C30 alkenylene group, or a branched or unbranched C2 to C30 alkynylene group; and $R^1$ and $R^2$ together may form a ring structure.

A silane coupling agent having the above structure, which satisfies the above molar ratio of the linking unit A and the linking unit B, can suppress an increase in the viscosity during processing, compared to polysulfide silanes such as bis-(3-triethoxysilylpropyl)tetrasulfide. This is presumably because such a silane coupling agent is thermally stabler than tetrasulfide or disulfide because of the sulfide moiety of the linking unit A being a C—S—C bond, and therefore the Mooney viscosity is less likely to increase.

Also, the silane coupling agent satisfying the above molar ratio of the linking unit A and the linking unit B can suppress shortening of the scorch time, compared to mercapto silanes such as 3-mercaptopropyltrimethoxysilane. This is presumably because, though the linking unit B has a mercaptosilane structure, the —$C_7H_{15}$ moiety of the linking unit A covers the —SH group of the linking unit B, as a result of which the —SH group is less likely to react with polymers and therefore scorching does not easily occur.

In order to more successfully achieve the effects of the present invention, the content of the linking unit A in the silane coupling agent having the above structure is preferably 30 mol % or more, and more preferably 50 mol % or more, but the content thereof is preferably 99 mol % or less, and more preferably 90 mol % or less. Also, the content of the linking unit B is preferably 5 mol % or more, and more preferably 10 mol % or more, but the content thereof is preferably 65 mol % or less, and more preferably 55 mol % or less. The total content of the linking units A and B is preferably 95 mol % or more, more preferably 98 mol % or more, and particularly preferably 100 mol %.

It should be noted that the content of the linking unit A or B is the amount of the linking unit A or B including that located at the end of the silane coupling agent, if present. In the case where the linking unit A or B is located at the end of the silane coupling agent, this end moiety is not particularly limited as long as it is an end moiety corresponding to the formula (1) or (2) representing the linking unit A or B.

Examples of the halogen for $R^1$ include chlorine, bromine, and fluorine.

Examples of the branched or unbranched C1 to C30 alkyl group for $R^1$ include methyl, ethyl, n-propyl, isopropyl, n-butyl, iso-butyl, sec-butyl, tert-butyl, pentyl, hexyl, heptyl, 2-ethylhexyl, octyl, nonyl, and decyl. The carbon number of the alkyl group is preferably 1 to 12.

Examples of the branched or unbranched C2 to C30 alkenyl group for $R^1$ include vinyl, 1-propenyl, 2-propenyl, 1-butenyl, 2-butenyl, 1-pentenyl, 2-pentenyl, 1-hexenyl, 2-hexenyl, and 1-octenyl. The carbon number of the alkenyl group is preferably 2 to 12.

Examples of the branched or unbranched C2 to C30 alkynyl group for $R^1$ include ethynyl, propynyl, butynyl, pentynyl, hexynyl, heptynyl, octynyl, nonynyl, decynyl, undecynyl, and dodecynyl. The carbon number of the alkynyl group is preferably 2 to 12.

Examples of the branched or unbranched C1 to C30 alkylene group for $R^2$ include ethylene, propylene, butylene, pentylene, hexylene, heptylene, octylene, nonylene, decylene, undecylene, dodecylene, tridecylene, tetradecylene, pentadecylene, hexadecylene, heptadecylene, and octadecylene. The carbon number of the alkylene group is preferably 1 to 12.

Examples of the branched or unbranched C2 to C30 alkenylene group for $R^2$ include vinylene, 1-propenylene, 2-propenylene, 1-butenylene, 2-butenylene, 1-pentenylene, 2-pentenylene, 1-hexenylene, 2-hexenylene, and 1-octenylene. The carbon number of the alkenylene group is preferably 2 to 12.

Examples of the branched or unbranched C2 to C30 alkynylene group for $R^2$ include ethynylene, propynylene, butynylene, pentynylene, hexynylene, heptynylene, octynylene, nonynylene, decynylene, undecynylene, and dodecynylene. The carbon number of the alkynylene group is preferably 2 to 12.

In the silane coupling agent having the above structure, the total number of repetitions (x+y) of the number of repetitions (x) of the linking unit A and the number of repetitions (y) of the linking unit B is preferably in the range of 3 to 300. If the number of repetitions is in the above range, the —$C_7H_{15}$ moiety of the linking unit A covers the —SH group in the mercaptosilane structure of the linking unit B, which enables to suppress shortening of the scorch time and secure favorable reactivity to silica and the rubber component.

Examples of the silane coupling agent having the above structure include NXT-Z30, NXT-Z45, and NXT-Z60 (Momentive Performance Materials). Any of these may be used alone, or two or more of these may be used in combination.

The content of the silane coupling agent having the above structure is preferably 1 part by mass or more, more preferably 2 parts by mass or more, and still more preferably 3 parts by mass or more, per 100 parts by mass of silica. The content less than 1 part by mass may not contribute to sufficient improvement of the performance on ice and snow and abrasion resistance. The content of the silane coupling agent is preferably 20 parts by mass or less, more preferably 16 parts by mass or less, and still more preferably 10 parts by mass or less, per 100 parts by mass of silica. The content more than 20 parts by mass tends not to contribute to further improvement of the performance on ice and snow and abrasion resistance, thereby failing to produce an effect commensurate with the increase in cost.

The rubber composition of the present invention may contain other silane coupling agent(s) together with the silane coupling agent having the above structure. Examples of the other silane coupling agent(s) include bis(3-triethoxysilylpropyl)tetrasulfide, bis(3-trimethoxysilylpropyl)tetrasulfide, bis(2-triethoxysilylethyl)tetrasulfide, 3-mercaptopropyltriethoxysilane, and 2-mercaptoethyltrimethoxysilane. Each of these may be used alone, or two or more of these may be used in any combination. Among these, bis(3-triethoxysilylpropyl)tetrasulfide and 3-mercaptopropyl triethoxysilane are preferred in terms of the higher reinforcing effect of the silane coupling agents and better proccessability, and bis(3-triethoxysilylpropyl)tetrasulfide is more preferred in terms of particularly better proccessability.

In the case of using other silane coupling agent(s), it is preferable, in terms of securing favorable proccessability, that the content thereof is 0.5 to 10 parts by mass per 100 parts by mass of silica, but smaller than the content of the silane coupling agent having the above structure.

(Carbon Black)

The rubber composition of the present invention contains carbon black which provides reinforcement. Further, adding carbon black together with aromatic oil and silica to NR and BR improves the abrasion resistance, performance on ice and snow, and wet grip performance in a balanced manner. Examples of the carbon black include, but are not particularly limited to, SAF, ISAF, HAF, FF, and GPF.

The carbon black preferably has an average particle size of 31 nm or smaller and/or a DBP oil absorption of 100 ml/100 g or more. The addition of such carbon black provides the required reinforcement, secures the block rigidity, uneven-wear resistance, and tensile strength, and can more successfully achieve the effects of the present invention.

The average particle size of carbon black of larger than 31 nm may greatly deteriorate the tensile strength and make it difficult to secure the abrasion resistance. The average particle size of carbon black is more preferably 25 nm or smaller, and still more preferably 23 nm or smaller. Also, the average particle size of carbon black is preferably 15 nm or larger, and more preferably 19 nm or larger. The average particle size smaller than 15 nm may greatly increase the viscosity of a rubber composition containing such carbon black, and thus deteriorate the proccessability. In the present invention, the average particle size is a number-average particle size, and can be measured with a transmission electron microscope.

The DBP oil absorption (dibutyl phthalate oil absorption) of carbon black of less than 100 ml/100 g may lead to low reinforcement and make it difficult to secure the abrasion resistance. The DBP oil absorption of carbon black is more preferably 105 ml/100 g or more, and still more preferably 110 ml/100 g or more. Also, the DBP oil absorption of carbon black is preferably 160 ml/100 g or less, and more preferably 150 ml/100 g or less. At a DBP oil absorption of more than 160 ml/100 g, this carbon black itself is difficult to produce.

Here, the DBP oil absorption of carbon black can be measured in accordance with the measuring method described in JIS K6217-4:2001.

The nitrogen adsorption specific surface area ($N_2SA$) of carbon black is preferably 80 $m^2/g$ or larger, and more preferably 110 $m^2/g$ or larger. The $N_2SA$ smaller than 80 $m^2/g$ may greatly deteriorate the tensile strength and make it difficult to secure the abrasion resistance. Also, the $N_2SA$ of carbon black is preferably 200 $m^2/g$ or smaller, and more preferably 150 $m^2/g$ or smaller. The $N_2SA$ larger than 200 $m^2/g$ may greatly increase the viscosity of a rubber composition containing such carbon black, and thus deteriorate the proccessability.

Here, the $N_2SA$ of carbon black can be determined in accordance with JIS K6217-2:2001.

The content of carbon black is preferably 2 parts by mass or more, more preferably 3 parts by mass or more, and still more preferably 5 parts by mass or more, per 100 parts by mass of the rubber component. The content less than 2 parts by mass may result in a great reduction in weather resistance and ozone resistance. Also, the content of carbon black is preferably 50 parts by mass or less, more preferably 30 parts by mass or less, still more preferably 20 parts by mass or less, and particularly preferably 15 parts by mass or less, per 100 parts by mass of the rubber component. The content more than 50 parts by mass may deteriorate the low-temperature properties, so that the performance on ice and snow required for winter tires may not be secured.

The proportion of silica to 100% by mass of a total of silica and carbon black is 45% by mass or more, preferably 50% by mass or more, and more preferably 55% by mass or more. The proportion less than 45% by mass may not result in achievement of both high performance on ice and snow and high abrasion resistance. Also, the proportion of silica to 100% by mass of a total of silica and carbon black is preferably 95% by mass or less, more preferably 93% by mass or less, and still more preferably 90% by mass or less. The proportion more than 95% by mass may greatly deteriorate the weather resistance and ozone resistance.

(Other Compounding Ingredients)

The rubber composition may optionally contain compounding ingredients conventionally used in the rubber industry, in addition to the above ingredients. Examples of the compounding ingredients include other fillers, stearic acid, antioxidants, age resistors, zinc oxide, peroxides, vulcanizing agents (e.g. sulfur, sulfur-containing compounds), and vulcanization accelerators.

The rubber composition of the present invention can be suitably used for treads of winter tires. The rubber composition of the present invention is applicable to vehicles such as trucks and buses and is particularly preferably used for winter tires for passenger vehicles which importantly require high handling stability on ice and snow.

EXAMPLES

Hereinafter, the present invention will be described in more detail based on the examples which, however, are not intended to limit the scope of the present invention.

In the following, the chemical agents used in the examples and comparative examples are listed.

NR: RSS #3

BR: BR150B (cis-1,4 bond content: 97% by mass, $ML_{1+4}$ (100° C.): 40, viscosity of a 5% by mass solution in toluene at 25° C.: 48 cps, Mw/Mn: 3.3) produced by Ube Industries, Ltd.

Carbon black: N220 ($N_2SA$: 120 $m^2/g$, average particle size: 23 nm, DBP oil absorption: 115 ml/100 g) produced by Cabot Japan K.K.

Silica: Ultrasil VN3 ($N_2SA$: 175 $m^2/g$) produced by Degussa

Tetrasulfide silane: Si69 (bis(3-triethoxysilylpropyl)tetrasulfide) produced by Degussa Mercapto silane: A1891 (3-mercaptopropyltriethoxysilane) produced by Momentive Performance Materials Silane coupling agent A: NXT-Z15 (copolymer of linking unit A and linking unit B (linking unit A: 85 mol %, linking unit B: 15 mol %)) produced by Momentive Performance Materials Silane coupling agent B: NXT-Z30 (copolymer of linking unit A and linking unit B (linking unit A: 70 mol %, linking unit B: 30 mol %)) produced by Momentive Performance Materials Silane coupling agent C: NXT-Z45 (copolymer of linking unit A and linking unit B (linking unit A: 55 mol %, linking unit B: 45 mol %)) produced by Momentive Performance Materials Silane coupling agent D: NXT-Z80 (copolymer of linking unit A and linking unit B (linking unit A: 20 mol %, linking unit B: 80 mol %)) produced by Momentive Performance Materials Mineral oil: PS-32 (paraffinic process oil) produced by Idemitsu Kosan Co., Ltd.

Aromatic oil: Process oil NC300S (aromatic hydrocarbon ($C_A$) content: 29% by mass) produced by Japan Energy Corporation Stearic acid: Kiri produced by NOF Corporation Zinc oxide: Zinc oxide #2 produced by Mitsui Mining & Smelting Co., Ltd.

Antioxidant: NOCRAC 6C (N-(1,3-dimethylbutyl)-N'-phenyl-p-phenylenediamine) produced by Ouchi Shinko Chemical Industrial Co., Ltd.

Wax: OZOACE wax produced by Nippon Seiro Co., Ltd.

Sulfur: Sulfur powder produced by Tsurumi Chemical Industry Co., Ltd.

Vulcanization accelerator TBBS: NOCCELER NS (N-tert-butyl-2-benzothiazolylsulfenamide) produced by Ouchi Shinko Chemical Industrial Co., Ltd.

Vulcanization accelerator DPG: NOCCELER D (N,N'-diphenylguanidine) produced by Ouchi Shinko Chemical Industrial Co., Ltd.

Examples 1 to 9 and Comparative Examples 1 to 6

The chemical agents were put into a Banbury mixer in amounts according to the formulation amounts shown in Process 1 in Table 1. They were mixed and kneaded for five minutes so that the outlet temperature was raised to about 150° C. Thereafter, the sulfur and vulcanization accelerators in amounts shown in Process 2 were added to the mixture obtained through Process 1, and they were mixed and kneaded for three minutes at about 80° C. by an open roll mill, whereby an unvulcanized rubber composition was prepared. A portion of the obtained unvulcanized rubber composition was press-vulcanized for ten minutes at 170° C., so that a vulcanized rubber composition (vulcanized rubber sheet) was produced.

Also, another portion of the unvulcanized rubber composition was formed into a tread shape and assembled with other tire components. Then, the assembly was vulcanized for 15 minutes at 170° C., and thereby a test winter tire (winter tire for a passenger vehicle, having a tire size of 195/65R15, and the pattern DS-2) was produced.

The unvulcanized rubber compositions, vulcanized rubber sheets, and test winter tires were evaluated by the methods described below.

<Mooney Viscosity and Scorch Time>

The Mooney viscosity ($ML_{1+4}$) and the scorch time of the unvulcanized rubber composition were measured at 130° C. by MV202 produced by Shimadzu Corp., based on JIS K 6300-1:2001. The resulting values are shown as indexes relative to the value of Mooney viscosity or scorch time of Comparative Example 1 taken as 100. A smaller index of Mooney viscosity indicates better proccessability, and a larger index of scorch time indicates better proccessability.

<Hardness>

In accordance with JIS K6253:2006 "Rubber, vulcanized or thermoplastic—Determination of hardness", the hardness of the vulcanized rubber sheet was determined at 0° C. by a type A durometer. The resulting values are shown as indexes relative to the value of Comparative Example 1 taken as 100.

<Glass Transition Temperature (Tg)>

A test piece of a predetermined size was cut out from each of the vulcanized rubber sheets. Then, the temperature dependence curve of tan δ (at from −100° C. to 100° C.) of each test piece was determined with a viscoelasticity spectrometer VES produced by Iwamoto Seisakusho Co., Ltd. under the following conditions: an initial strain of 10%; a dynamic strain of 0.5%; a frequency of 10 Hz and an amplitude of ±0.25%; and a temperature increase rate of 2° C./min. From the obtained temperature dependence curve, the tan δ peak temperature was determined, and this temperature was taken as Tg.

<Performance on Ice and Snow>

The test winter tires were evaluated for on-vehicle performance on ice and snow under the following conditions. Here, each set of winter tires was mounted on a 2000-cc FR car made in Japan. The test was run on a test course of Sumitomo Rubber Industries, Ltd. in Nayoro, Hokkaido, Japan. The temperature on ice was from −6° C. to −1° C. and the temperature on snow was from −10° C. to −2° C.

Braking performance (brake stopping distance on ice): The brake stopping distance on ice was measured which was the distance required for the car to stop after the brakes that lock up were applied at 30 km/h. The resulting values are shown as indexes calculated from the following formula, with the resulting value of Comparative Example 1 taken as a reference.

(Index of performance on ice and snow)=(Brake stopping distance in Comparative Example 1)/(Brake stopping distance of each tire)×100

A larger index indicates better braking performance on ice and snow.

<Wet Grip Performance>

The car with each of test winter tires was driven on an asphalt test course (wet road surface). The grip performance (grip feel, brake performance, traction performance) during the driving was evaluated by feeling.

In the feeling evaluation, the performance of the tire in Comparative Example 1 was regarded as the standard and was graded 100. Then, grading was made in such a manner that tires were graded 120 if the test driver judged that their performance was obviously improved; and tires were graded 140 if the test driver judged that their performance was at a high level never seen before.

<Abrasion Resistance>

Each of test winter tires (tire size: 195/65R15) was mounted on an FF car made in Japan, and the depth of grooves on the tire tread part was measured after the car had run 8000 km. From the measured value, the running distance that decreased the depth of the tire grooves by 1 mm was calculated and used in the following formula to calculate the abrasion resistance index.

(Abrasion resistance index)=(Running distance that decreases tire groove depth by 1 mm in each example)/(Running distance that decreases tire groove depth by 1 mm in Comparative Example 1)×100

A larger index indicates better abrasion resistance.

Table 1 shows that, in the Examples in which predetermined amounts of natural rubber, butadiene rubber, aromatic oil, silica, and carbon black were used and also a specific silane coupling agent (silane coupling agent A to C) was used, the abrasion resistance, performance on ice and snow, and wet grip performance were improved in a balanced manner, and the proccessability was also excellent. In Comparative Example 3 in which the silane coupling agent D, which had the linking unit A and the linking unit B, was used, favorable proccessability could not be secured because the proportion of the linking unit B was too high.

The invention claimed is:

1. A winter tire produced using a rubber composition, comprising:
    a rubber component including natural rubber and butadiene rubber;
    aromatic oil;
    silica;
    carbon black; and
    a silane coupling agent,
    wherein a total content of the natural rubber and the butadiene rubber is 30% by mass or more based on 100% by mass of the rubber component;
    a content of the aromatic oil is 12 to 85 parts by mass and a content of the silica is 12 to 85 parts by mass, each per 100 parts by mass of the rubber component;

TABLE 1

|  |  |  | Examples |  |  |  |  |  |  |  |  | Comparative Examples |  |  |  |  |  |
|---|---|---|---|---|---|---|---|---|---|---|---|---|---|---|---|---|---|
|  |  |  | 1 | 2 | 3 | 4 | 5 | 6 | 7 | 8 | 9 | 1 | 2 | 3 | 4 | 5 | 6 |
| Formulation (parts by mass) | Process 1 | NR | 60 | 60 | 60 | 60 | 60 | 60 | 60 | 60 | 60 | 60 | 60 | 60 | 60 | 60 | 60 |
|  |  | BR | 40 | 40 | 40 | 40 | 40 | 40 | 40 | 40 | 40 | 40 | 40 | 40 | 40 | 40 | 40 |
|  |  | Carbon black | 5 | 5 | 5 | 5 | 5 | 5 | 15 | 15 | 15 | 5 | 5 | 5 | 20 | 20 | 20 |
|  |  | Silica | 60 | 60 | 60 | 80 | 80 | 80 | 15 | 15 | 15 | 60 | 60 | 60 | 20 | 20 | 20 |
|  |  | Tetrasulfide silane | — | — | — | — | — | — | — | — | — | 4.8 | — | — | 1.6 | — | — |
|  |  | Mercapto silane | — | — | — | — | — | — | — | — | — | — | 4.8 | — | — | 1.6 | — |
|  |  | Silane coupling agent A | 4.8 | — | — | 6.4 | — | — | 1.2 | — | — | — | — | — | — | — | — |
|  |  | Silane coupling agent B | — | 4.8 | — | — | 6.4 | — | — | 1.2 | — | — | — | — | — | — | — |
|  |  | Silane coupling agent C | — | — | 4.8 | — | — | 6.4 | — | — | 1.2 | — | — | — | — | — | — |
|  |  | Silane coupling agent D | — | — | — | — | — | — | — | — | — | — | — | 4.8 | — | — | 1.6 |
|  |  | Mineral oil | — | — | — | — | — | — | — | — | — | — | — | — | 20 | 20 | 20 |
|  |  | Aromatic oil | 60 | 60 | 60 | 80 | 80 | 80 | 30 | 30 | 30 | 60 | 60 | 60 | — | — | — |
|  |  | Stearic acid | 2 | 2 | 2 | 2 | 2 | 2 | 2 | 2 | 2 | 2 | 2 | 2 | 2 | 2 | 2 |
|  |  | Zinc oxide | 3 | 3 | 3 | 3 | 3 | 3 | 3 | 3 | 3 | 3 | 3 | 3 | 3 | 3 | 3 |
|  |  | Antioxidant | 2 | 2 | 2 | 2 | 2 | 2 | 2 | 2 | 2 | 2 | 2 | 2 | 2 | 2 | 2 |
|  |  | Wax | 2 | 2 | 2 | 2 | 2 | 2 | 2 | 2 | 2 | 2 | 2 | 2 | 2 | 2 | 2 |
|  | Process 2 | Sulfur | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 |
|  |  | Vulcanization accelerator TBBS | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 |
|  |  | Vulcanization accelerator DPG | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| Evaluation |  | Mooney viscosity (index) | 85 | 90 | 95 | 80 | 85 | 90 | 90 | 95 | 100 | 100 | 130 | 110 | 105 | 135 | 115 |
|  |  | Scorch time (index) | 110 | 105 | 100 | 115 | 110 | 105 | 108 | 103 | 100 | 100 | 50 | 100 | 95 | 45 | 100 |
|  |  | Hardness (0° C.) | 100 | 99 | 98 | 102 | 101 | 100 | 96 | 95 | 94 | 100 | 100 | 101 | 98 | 98 | 99 |
|  |  | Tg (° C.) | −65 | −65 | −65 | −67 | −67 | −67 | −61 | −61 | −61 | −65 | −65 | −65 | −60 | −60 | −60 |
|  |  | Performance on ice and snow (index) | 114 | 115 | 118 | 112 | 113 | 116 | 120 | 121 | 124 | 100 | 105 | 110 | 95 | 100 | 105 |
|  |  | Wet grip performance (index) | 112 | 115 | 113 | 120 | 125 | 123 | 106 | 109 | 107 | 100 | 105 | 105 | 75 | 80 | 85 |
|  |  | Abrasion resistance (index) | 105 | 110 | 110 | 100 | 105 | 106 | 100 | 105 | 105 | 100 | 95 | 100 | 80 | 75 | 80 | a proportion of the silica to 100% by mass of a total of the silica and the carbon black is 45% by mass or more;

a content of the silane coupling agent is 1 to 20 parts by mass per 100 parts by mass of the silica; and the silane coupling agent includes a linking unit A represented by the following formula (1) and a linking unit B represented by the following formula (2) and has a content of the linking unit B of 15 to 60 mol %:

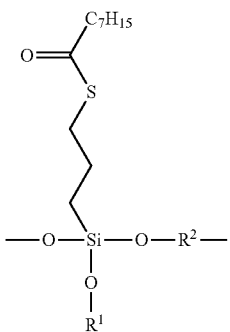

(1)

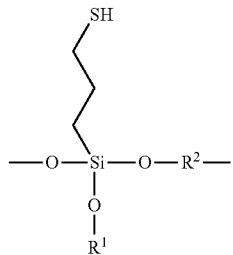

(2)

wherein $R^1$ represents hydrogen, halogen, a branched or unbranched C1 to C30 alkyl group, a branched or unbranched C2 to C30 alkenyl group, a branched or unbranched C2 to C30 alkynyl group, or a group in which a terminal hydrogen of the alkyl group is replaced by a hydroxyl group or a carboxyl group; $R^2$ represents a branched or unbranched C1 to C30 alkylene group, a branched or unbranched C2 to C30 alkenylene group, or a branched or unbranched C2 to C30 alkynylene group; and $R^1$ and $R^2$ together may form a ring structure.

* * * * *